Dec. 15, 1936.   M. E. ISH   2,064,164
DISPLAY RACK FOR LAWN MOWERS
Filed April 3, 1936   2 Sheets-Sheet 1
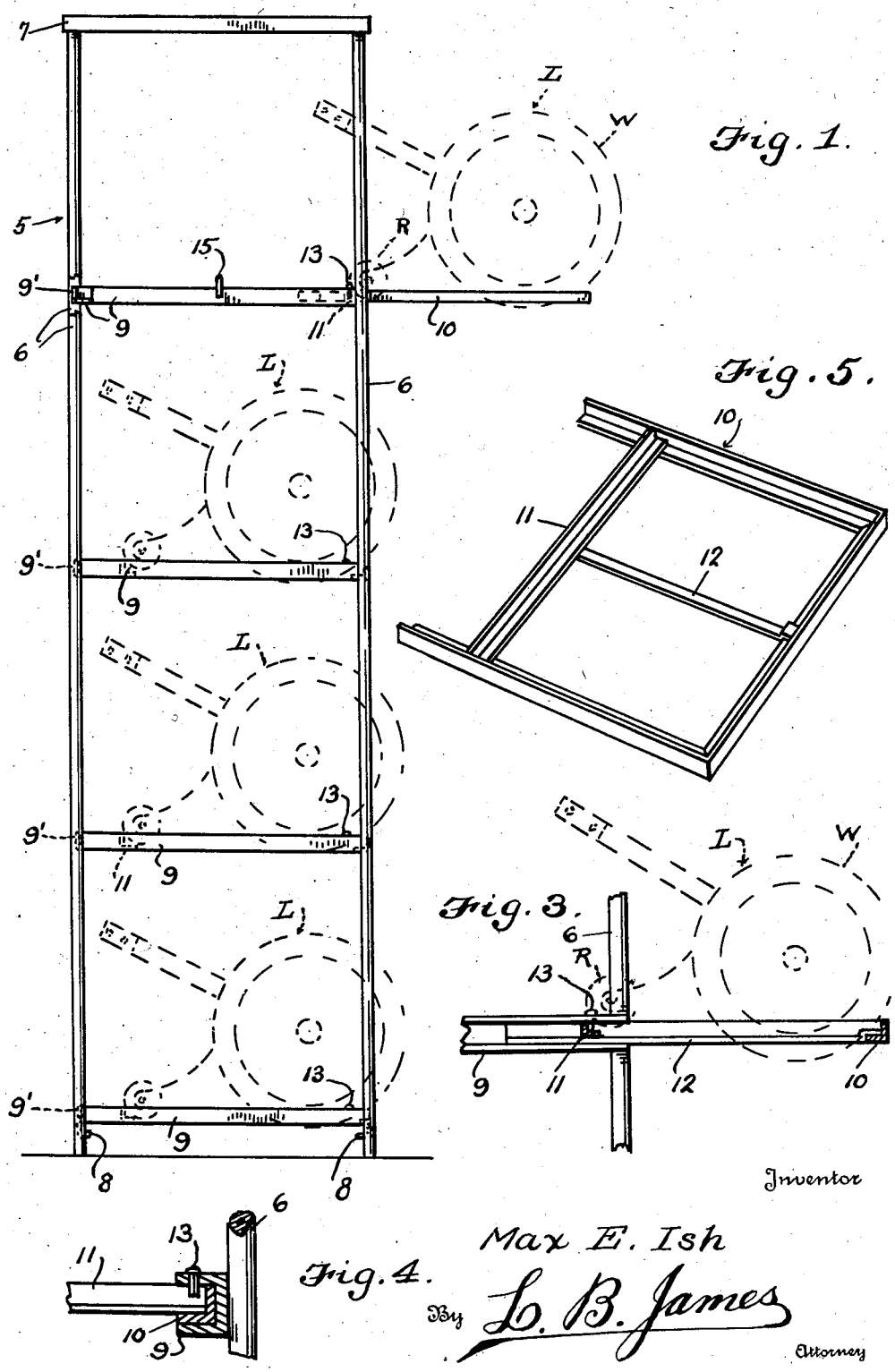
Inventor
Max E. Ish
By L. B. James
Attorney Dec. 15, 1936.                    M. E. ISH                    2,064,164
                        DISPLAY RACK FOR LAWN MOWERS
                           Filed April 3, 1936          2 Sheets-Sheet 2
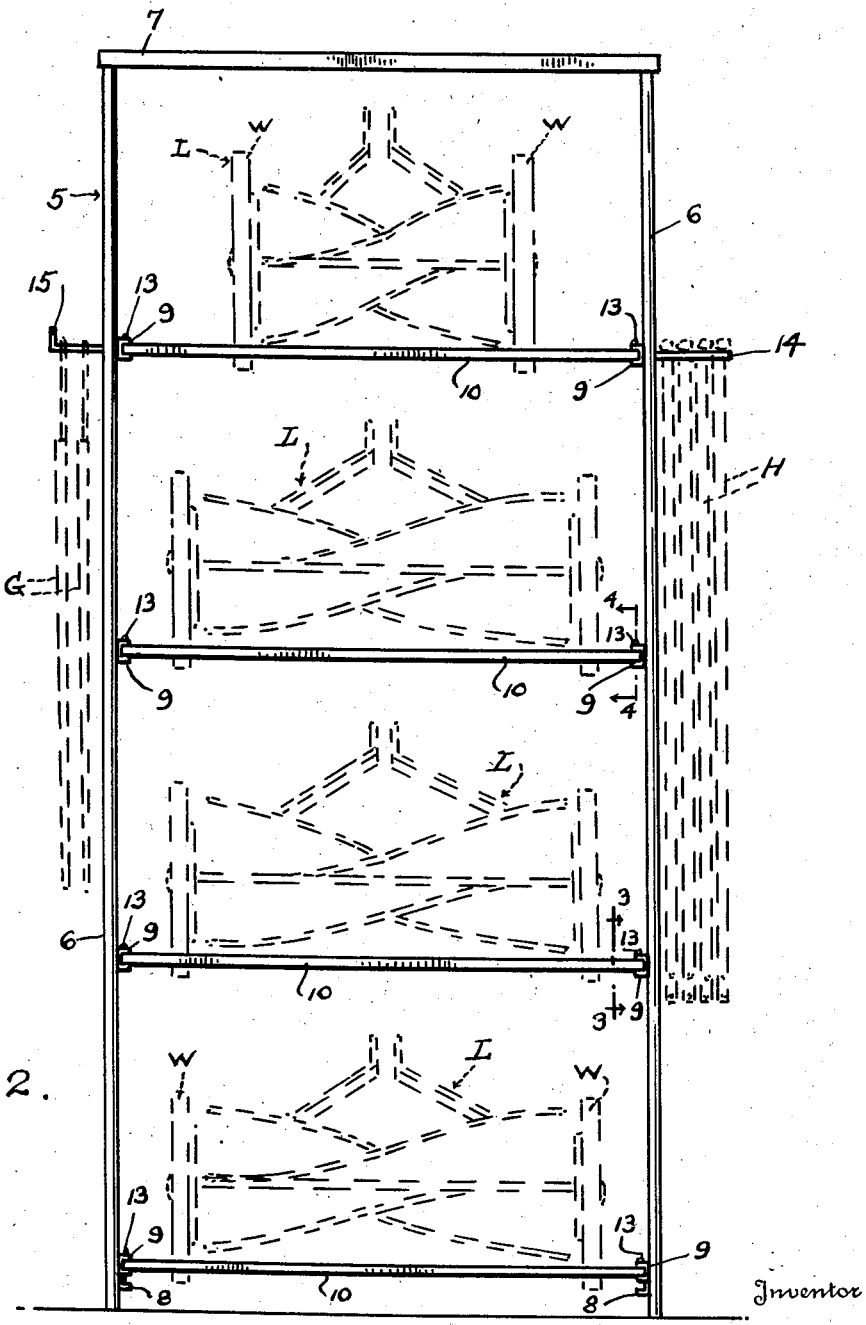
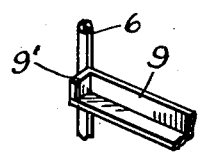
Fig. 6.
Inventor
Max E. Ish
By L. B. James
       Attorney Patented Dec. 15, 1936

2,064,164

UNITED STATES PATENT OFFICE 2,064,164

DISPLAY RACK FOR LAWN MOWERS

Max E. Ish, Salinas, Calif.

Application April 3, 1936, Serial No. 72,630

1 Claim. (Cl. 211—13)

This invention relates to display racks and more particularly to display racks for lawn mowers.

The primary object of this invention resides in the provision of a display rack for lawn mowers adapted to support a number of lawn mowers above a space of an area approximately equal to that occupied by a single lawn mower.

Another object of this invention resides in the provision of a display rack for lawn mowers adapted to support a number of lawn mowers above a space of an area approximately equal to that occupied by a single lawn mower so they can be withdrawn from their normal positions for inspection by a customer.

A further object of this invention resides in the provision of a display rack for lawn mowers of such construction that inspection of the lawn mowers can be made without removing them from the rack.

A still further object of this invention resides in the provision of a display rack for lawn mowers consisting of particularly constructed shelves adapted to slide relative to the support thereof.

With these and other objects in view this invention resides in certain novel features of construction and arrangement of elements to be hereinafter set forth in the specification, illustrated in the accompanying drawings and pointed out in the appended claims and, while this disclosure depicts my present conception of the invention, the right is reserved to resort to such changes in construction and arrangement of elements as come within the scope of the claims.

In the accompanying drawings forming a part of this application:

Fig. 1 is a side view of a display rack constructed in accordance with this invention.

Fig. 2 is a front view thereof.

Fig. 3 is a detail sectional view approximately on line 3—3 of Fig. 2 showing the shelf in extended position.

Fig. 4 is a detail sectional view approximately on line 4—4 of Fig. 2.

Fig. 5 is a detail perspective view of one of the shelves.

Fig. 6 is a detail view of a portion of an upright and attached channel element.

In the present illustration of this invention the numeral 5 designates, in general, a lawn mower display rack which preferably consists of spaced standards 6 connected at their upper ends by a substantially rectangular frame 7, certain of said standards being further connected together adjacent their lower ends by braces 8, thus it is apparent that a substantially rectangular open frame is provided.

Secured to certain of the standards at appropriate distances apart, in opposed relation to one another, are channel-bars 9 which are adapted to slidably accommodate substantially U-shaped lawn mower supporting shelves 10 prevented from sliding in one direction by stops 9' formed on the channel-bar.

The aforesaid shelves 10 are preferably constructed from angle-iron as clearly illustrated in Fig. 5, each of which is provided with an angle-iron cross-bar 11 which is connected to one member of the shelf structure by a brace 12.

The shelves 10 are adapted to slidably seat in the channel-bars 9 and, in order to prevent them from being accidentally slid therefrom, pins or rivets 13 are inserted through certain of the webs of the channel-bars in the path of the cross bar 11.

With the shelves disposed in slidable relation to the channel-bars, they are not only adapted to be withdrawn for conveniently depositing the lawn mowers thereon but to better display the lawn mowers to the customers and, in this connection, particular attention is invited to the utility of the channel-bar construction of the shelves.

The letter L designates a conventional lawn mower herein shown in dotted lines and, among other necessary elements thereof consists of traction wheels W and a roller R.

Upon depositing a lawn mower on either of the shelves the roller thereof is seated in the cross-bar 11 with the traction wheels resting against a certain opposed member of the shelf structure, thus it is apparent use of fastening means for securing the lawn mowers to the shelves are unnecessary.

Before depositing the lawn mowers on the shelves their handles, indicated by dotted lines H, are removed and hung on a substantially U-shaped bracket 14 secured to one of the channel-bars 9 while secured to the opposed channel-bar 9 is a hook 15 adapted to support the lawn mower grass catchers indicated by dotted lines at G.

With this invention fully set forth it is manifest that means are provided whereby a number of lawn mowers can be displayed within an area approximately equal to that normally occupied by a single lawn mower and, through the particular construction of the assemblage involved, the lawn mowers can be readily inspected without removal from the rack.

Having thus fully described my invention what I claim and desire protected by Letters Patent is:

A display rack for lawn mowers comprising a frame having corner standards, channeled side bars extending horizontally between said standards in vertical spaced relation to each other and constituting opposed tracks having inwardly extending upper and lower flanges and shelves supported by said side-bars, each shelf having an outer end bar formed with an upstanding flange along its outer edge and side arms extending rearwardly from ends of the outer bar and formed with upstanding flanges along their outer side edges and being slidably engaged in the tracks of opposed side bars of the frame, a cross bar extending between said side arms in spaced relation to rear ends thereof and formed with an upstanding flange along its rear edge, a bracing bar extending between the cross bar and the outer end bar midway the width of the shelf, and pins carried by the upper flanges of the side-bars of said frame and extending downwardly into the tracks in position for engaging end portions of the flanges of the cross bars of said shelves to limit sliding movement of the shelves out of the frame.

MAX E. ISH.